United States Patent
Izumi (10) Patent No.: US 8,365,612 B2
(45) Date of Patent: Feb. 5, 2013

(54) ELECTROMAGNETIC FLOWMETER HAVING A SEALING MEMBER FORMED OF TWO DIFFERENT MATERIALS

(75) Inventor: Kouji Izumi, Tokyo (JP)

(73) Assignee: Azbil Corporation, Tokyo (JP)

( * ) Notice: Subject to any disclaimer, the term of this patent is extended or adjusted under 35 U.S.C. 154(b) by 231 days.

(21) Appl. No.: 12/857,609

(22) Filed: Aug. 17, 2010

(65) Prior Publication Data

US 2011/0041620 A1   Feb. 24, 2011

(30) Foreign Application Priority Data

Aug. 19, 2009   (JP) .................................. 2009-190298

(51) Int. Cl.
*G01F 1/58* (2006.01)
*F16J 15/02* (2006.01)
(52) U.S. Cl. ...................... 73/861.12; 277/637; 277/650
(58) Field of Classification Search ......................... None
See application file for complete search history.

(56) References Cited

U.S. PATENT DOCUMENTS

| 2002/0101042 A1* | 8/2002 | Jarrus | 277/635 |
| 2004/0080120 A1* | 4/2004 | Fink | 277/608 |
| 2007/0163359 A1* | 7/2007 | Nielsen | 73/861.12 |

FOREIGN PATENT DOCUMENTS

| JP | 04-319622 A | 11/1992 |
| JP | 10-068467 A | 3/1998 |
| JP | 2006-153169 A | 6/2006 |
| WO | WO 2009/098916 A1 | 8/2009 |

* cited by examiner

*Primary Examiner* — Harshad R Patel (57) ABSTRACT

An electromagnetic flowmeter comprises an exiting coil, and a signal electrode having an electrode section, an axis portion, a first member which has elasticity, a second member which is harder than the first member, and a ring shape dividing wall which is harder than the second member, wherein the first and second members and the ring shape dividing wall are inserted between a rear face of the electrode section and an inner circumference face of the measuring pipe, the axis portion is projected to an outer circumference face of the measuring pipe through a through hole, and a fastening member is fastened to the axis portion which projects to the outer circumference face of the measuring pipe so that the first member is sandwiched between the rear face of the electrode section and the inner circumference face of the measuring pipe so as to be elastically deformed.

7 Claims, 8 Drawing Sheets

ELECTROMAGNETIC FLOWMETER HAVING A SEALING MEMBER FORMED OF TWO DIFFERENT MATERIALS

CROSS-REFERENCES TO RELATED APPLICATION

This application claims priority from Japanese Patent Application Serial No. 2009-190298 filed Aug. 19, 2009, the contents of which are incorporated herein by reference in its entirety.

TECHNICAL FIELD

Described below is an electromagnetic flowmeter having a signal electrode on an inner circumference face of a measuring pipe.

BACKGROUND

Conventionally, such a electromagnetic flowmeter has an exiting coil, which forms a magnetic field in a direction perpendicular to a flow direction of fluid flowing inside a measuring pipe, and signal electrodes which are provided on an inner circumference face of the measuring pipe so as to face a direction perpendicular to the magnetic field formed by the exiting coil, wherein an electromotive force, which is generated in the fluid flowing through the inside of the measuring pipe due to the magnetic field formed by the exiting coil, is taken out from the signal electrode (for example, refer to Japanese Patent Application Publication No. 4-319622).

Figure 7:
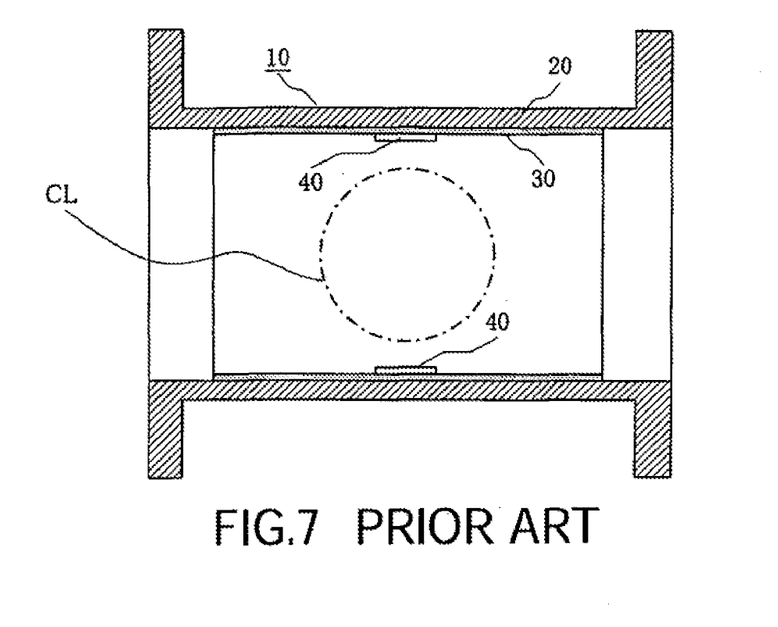
FIG. 7 shows a main portion of a conventional electromagnetic flowmeter.

A main section of such an electromagnetic flowmeter of the prior art is shown in FIG. 7.

In the figure, a measuring pipe 10 comprises a nonmagnetic metal pipe 20 (for example, a pipe made of nonmagnetic stainless steel), and a lining 30 formed on an inside of the nonmagnetic metal pipe 20. In this example, insulating resin powder is coated on the inside of the nonmagnetic metal pipe 20 by powder coating, thereby forming the lining 30. The signal electrodes 40 and 40 are provided so as to face the inner circumference face of the measuring pipe 10.

In addition, as schematically shown by a dashed-dotted line in FIG. 7, an exiting coil CL, which forms a magnetic field in a direction perpendicular to a flow direction of fluid flowing inside the measuring pipe 10, is provided. The signal electrodes 40 and 40 are provided so as to face in a direction perpendicular to the magnetic field formed by the exiting coil CL.

First Example of Installation Structure of Signal Electrode

Figure 8:
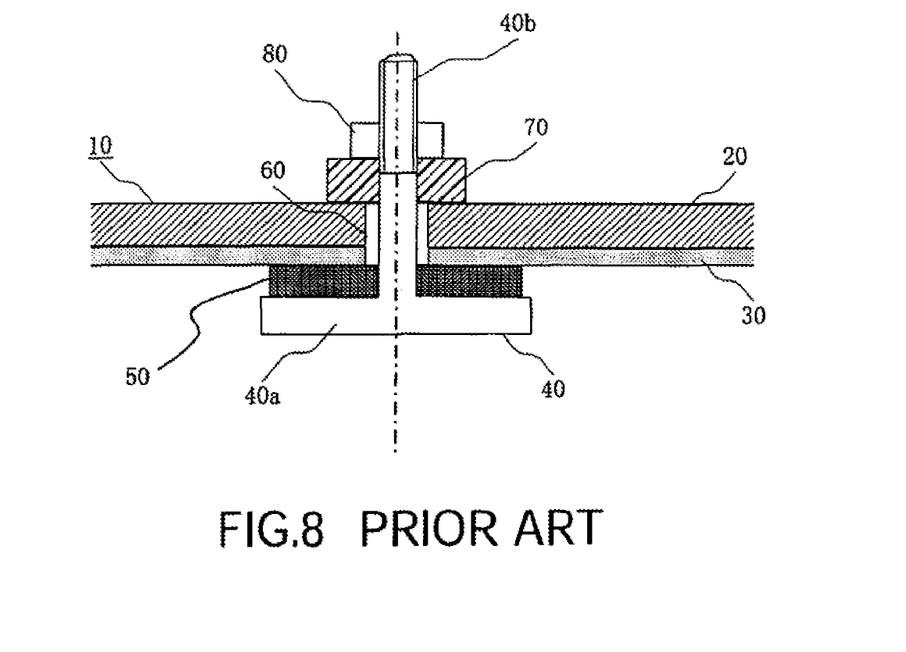
FIG. 8 shows a first example of an installation structure of a signal electrode in a conventional electromagnetic flowmeter.

A first example of an installation structure of one of signal electrodes 40 attached to an inner circumference face of a measuring pipe 10 is shown in FIG. 8. In this first example, an electrode section 40a of the signal electrode 40 is in a plate shape, and, an axis portion 40b is provided so as to project from the center of a rear face of the plate shape electrode section 40a. The signal electrode 40 is attached to the inner circumference face of the measuring pipe 10 as described below. First, a ring shape gasket 50 is inserted between the rear face of the electrode section 40a and the inner circumference face of the measuring pipe 10 (an inner circumference face of a lining 30), and the axis portion 40b is inserted in a through hole 60, which is formed in the measuring pipe 10, so as to project to an outer circumference face of the measuring pipe 10. After that, a nut 80 is tightened through a base 70 onto the axis portion 40b, which projects to the outer circumference face of the measuring pipe 10.

Second Installation Structure of Signal Electrode

Figure 9:
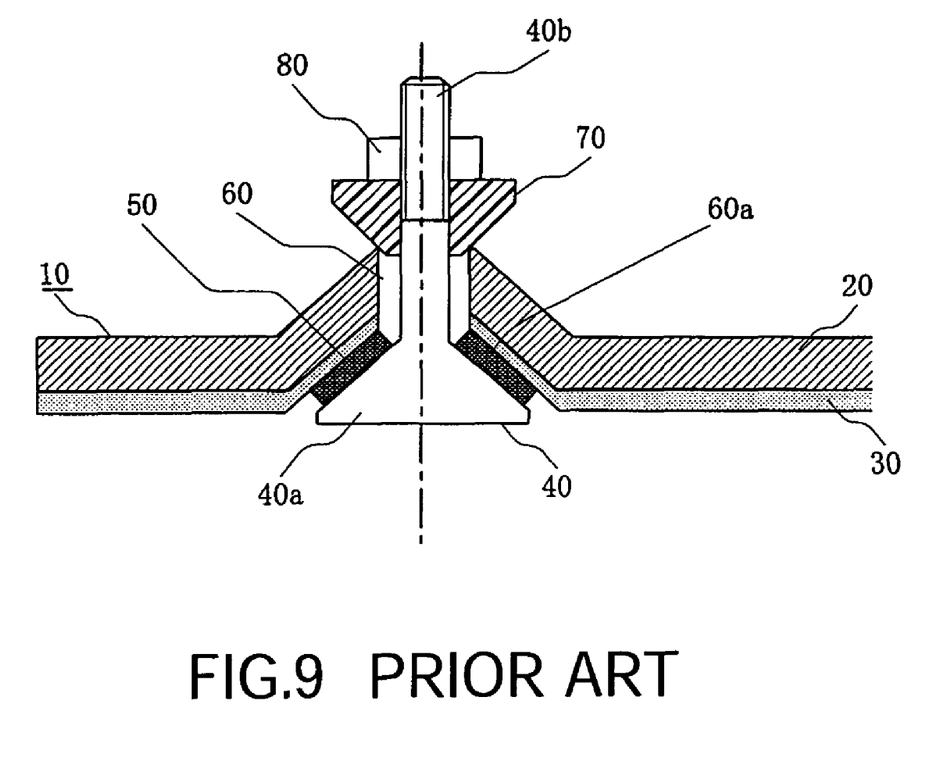
FIG. 9 shows a second example of an installation structure of a signal electrode in a conventional electromagnetic flowmeter.

A second example of an installation structure of a signal electrode 40 attached to an inner circumference face of a measuring pipe 10 is shown in FIG. 9. In the second example, an electrode section 40a of a signal electrode 40 is in a shape of a funnel, and an axis portion 40b is provided so as to extend from a neck base of the funnel shape electrode section 40a. An end face 60a of a through hole 60 of the measuring pipe 10 is dented in a funnel shape so as to fit on the shape of the electrode section 40a. A ring shape gasket 50 is inserted between a rear face of the electrode section 40a and the end face 60a of the through hole 60 (a surface of a lining 30), which has been dented in the funnel shape. The axis portion 40b is inserted in the through hole 60 so as to project to an outer circumference face of the measuring pipe 10. In such a manner, the signal electrode 40 is attached to the inner circumference face of the measuring pipe 10 by tightening a nut 80 through a base 70 to the axis portion 40b which projects to the outer circumference face of the measuring pipe 10.

In the installation structure (the first and second examples) of the signal electrode, since the gasket 50 is made from elastic member such as rubber, when the nut 80 is tightened on the base 70 to the axis portion 40b of the signal electrode 40, the gasket 50 is sandwiched between the electrode section 40a and the inner circumference face (the surface of the lining 30) of the measuring pipe 10, thereby causing elastic deformation thereto, so that the gasket 50 is brought into close contact with the inner circumference face of the electrode section 40a and the inner circumference face of the measuring pipe 10, whereby the measuring pipe 10 is sealed so that the fluid flowing through the inside of the measuring pipe 10, may not leak to the outside of the measuring pipe 10 through the through hole 60. In addition, the lining 30 is formed by powder coating and has insulating capacity, but is not elastic member. For this reason, such a method of inserting the gasket 50, which has elasticity, is adopted so as to secure the seal nature thereof.

When sealing is performed by using such a gasket having elasticity, it may be important to appropriately determine a value as to a properly designed tightening tolerance in order to achieve a long life span of a product. This is because sealing cannot be sufficiently secured to the internal pressure thereof when the gasket has a small tightening tolerance, while the deterioration of the gasket is accelerated when it is tightened too much.

However, in the above mentioned installation structure of the signal electrode of the prior art, although the gasket 50 is elastically deformed by tightening the nut 80 on the axis portion 40b of the signal electrode 40, the tightening tolerance thereof cannot be handled by only controlling a torque of the nut 80 since the tightening tolerance varies widely. In order to tighten the gasket 50 with a proper design tightening tolerance, it is required that tightening tolerance of every electromagnetic flowmeter need to be adjusted.

SUMMARY

In view of the above, it is an object of the present invention to provide an electromagnetic flowmeter in which a gasket can be easily tighten with a proper design tightening tolerance.

In order to solve the above problem, the present electromagnetic flowmeter comprises an exiting coil which forms a magnetic field in a direction perpendicular to a flow direction of fluid flowing through the inside of a measuring pipe, and a signal electrode which faces a direction perpendicular to the magnetic field formed by the exiting coil and which is provided on an inner circumference face of the measuring pipe, wherein an electromotive force, which is generated in the fluid flowing inside the measuring pipe due to the magnetic field formed by the exiting coil, is taken out by the signal electrodes, wherein a first member which has elasticity, a second member which is harder than the first member, and a ring shape dividing wall which is harder than the second member, are inserted between the inner circumference face of the measuring pipe and a rear face of an electrode section (which is in contact with the fluid) of the signal electrode, which faces the inner circumference face of the measuring pipe, in a state where the ring shape dividing wall is sandwiched between the first member and the second member, and wherein an axis portion is provided on a rear face side of the electrode section of the signal electrode, so as to be projected to an outer circumference face of the measuring pipe through a through hole formed between the inner circumference face of the measuring pipe and the outer circumference face thereof, wherein a fastening member is fastened to the axis portion which projects to the outer circumference face of the measuring pipe, so that the first member is sandwiched between the rear face of the electrode section, the inner circumference face of the measuring pipe, and the dividing wall, so as to be elastically deformed, whereby the signal electrode is attached to the inner circumference face of the measuring pipe.

Here, the first and second members are selected as set forth below. The material, the contact area, and the shape of the first member having elasticity, are determined according to the relation between the elasticity (hardness, softness) of the material to be selected and the fastening force of the signal electrode, so that the first member may be sufficiently elastically deformed due to fastening force, while the material, the contact area and the shape of the second member, which is harder than the first member, is determined so that the second member is hardly deformed even if the fastening force is applied thereto. In order to fulfill these conditions, for example, rubber is suitable for the first member, and fluorine resin (TEFLON (registered trademark)) is suitable for the second member. Hereafter, the first member is referred to a gasket and the second member is referred to a stopper. Moreover, although, in general, the ring shape dividing wall is integrally formed with a rear face side of the electrode section of the signal electrode, which faces the inner circumference face of the measuring pipe, the ring shape dividing wall may be formed as a separate member made of material (metal) or ceramics etc. whose hardness is equivalent to that of the electrode section.

It is possible to perform such fastening, even if the thickness of the gasket is larger than that of the stopper. When a fastening member, for example, a nut is fastened on the axis portion which is projected to the outer circumference face of the measuring pipe, the gasket is sandwiched between the rear face of the electrode section and the inner circumference face of the measuring pipe by a small fastening force, so as to be elastically deformed, whereby the thickness thereof becomes small. Furthermore, when the fastening force is increased, the thickness of the gasket becomes equal to the thickness of the stopper, wherein the elastic deformation of the gasket is limited by the hardness of the stopper. Here, tightening of the gasket become easy with a properly designed tightening tolerance by tightening the nut on the axis portion.

While the gasket having elasticity, the stopper which is harder than the gasket, and the ring shape dividing wall which is harder than the stopper, are inserted between the rear face of the electrode section of the signal electrode and the inner circumference face of the measuring pipe, in a state where the ring shape dividing wall is sandwiched between the gasket and the stopper, the axis portion is projected to the outer circumference face of the measuring pipe through the through hole formed between the inner circumference face of the measuring pipe and the outer circumference face thereof, and the axis portion, which is projected to the outer circumference face of the measuring pipe, is fastened by the fastening member, whereby the gasket is sandwiched between the rear face of the electrode section and the inner circumference face of the measuring pipe, so as to be elastically deformed, and thus, the signal electrode is attached to the inner circumference face of the measuring pipe. Therefore, the elastic deformation of the gasket is limited by the hardness of the stopper so that the gasket can be easily tightened with the proper design tightening tolerance.

BRIEF DESCRIPTION OF THE DRAWINGS

Other features and advantages of the present electromagnetic flowmeter will be apparent from the ensuing description, taken in conjunction with the accompanying drawings, in which.

DESCRIPTION

Detail description of embodiments will be given below referring to the drawings.

Figure 1A:
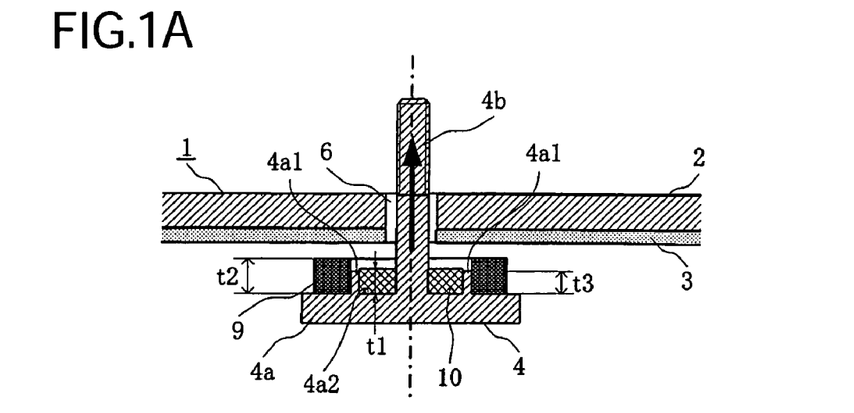
FIGS. 1A, 1B and 1C are explanatory diagrams of an installation structure of a signal electrode in an electromagnetic flowmeter according to a first example of a first embodiment.
Figure 1B:
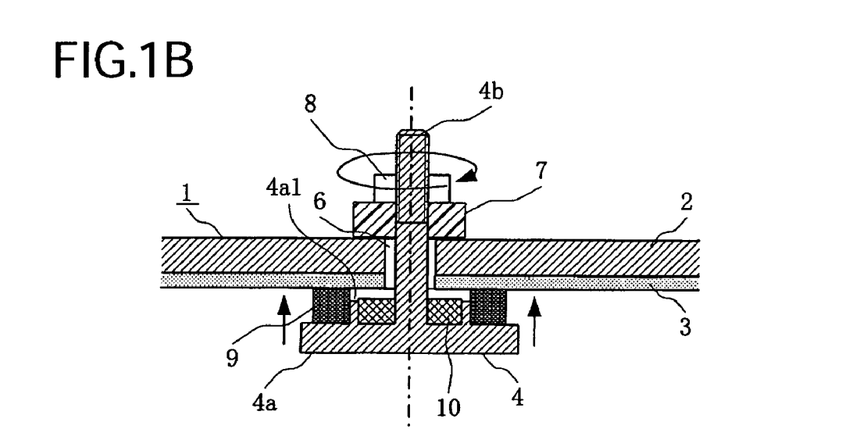
Figure 1C:
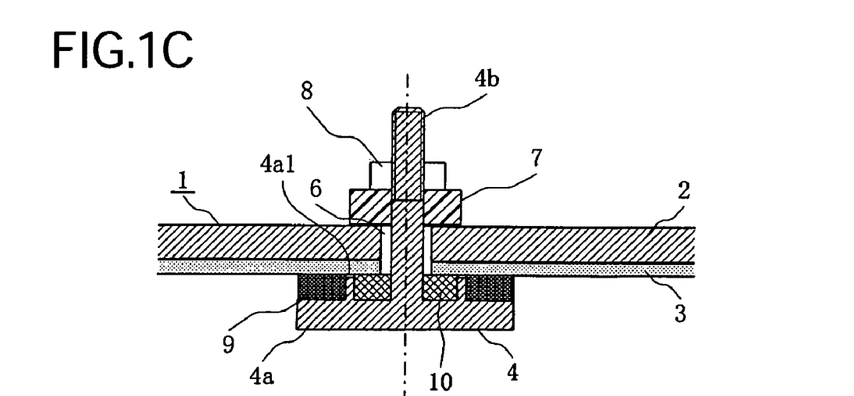

Installation Structure of Signal Electrode According to First Example of First Embodiment FIG. 1C shows a diagram of an installation structure of a signal electrode in an electromagnetic flowmeter according to a first example of a first embodiment. In FIGS. 1A, 1B and 1C, 1 denotes a measuring pipe, 2 denotes a metal pipe, 3 denotes a lining, 4 denotes a signal electrode, 4a denotes an electrode section, 4b denotes an axis portion, 6 denotes a through hole and 7 denotes a base and 8 denotes a nut, which respectively correspond to the measuring pipe 10, the metal pipe 20, the lining 30, the signal electrode 40, the electrode section 40a, the axis portion 40b, the through hole 60, the base 70, and the nut 80, in the first example of the conventional installation structure shown in FIG. 8.

FIG. 1A shows a state before fastening the nut 8 on the axis portion 4b of the signal electrode 4, FIG. 1B shows a state where the nut 8 is fastened on the axis portion 4b of the signal electrode 4, and FIG. 1C shows a state where tightening of the nut 8, which is fastened on the axis portion 4b of the signal electrode 4, is completed.

In the first example of an installation structure of this signal electrode, while a gasket 9 and a stopper 10 are inserted between an inner circumference face of the measuring pipe 1 and a rear face of the electrode section 4a, which faces the inner circumference face of the measuring pipe 1 (a surface of the lining 3), the axis portion 4b is inserted in the through hole 6 which is formed between the inner circumference face of the measuring pipe 1 and the outer circumference face thereof so as to project to the outer circumference face of the measuring pipe 1, and the nut 8 is tightened through the base 7 on the axis portion 4b which projects to the outer circumference face of the measuring pipe 1, whereby the signal electrode 4 is attached to the inner circumference face of the measuring pipe 1.

In this first example, the gasket 9 is made from an elastic member, such as rubber, and the stopper 10 is made from material (for example, Teflon) which is harder than that of the gasket 9. Moreover, the gasket 9 and the stopper 10 are in a ring shape, and are inserted in the axis portion 4b so that the gasket 9 is located outside the stopper 10, that is the stopper 10 is located inside the gasket 9. The gasket 9 and the stopper 10 are located between the rear face of the electrode section 4a and the inner circumference face of the measuring pipe 1. Moreover, a ring shape dividing wall 4a1 is integrally formed with a rear face side of the electrode section 4a of the signal electrode 4, wherein this ring shape dividing wall 4a1 is sandwiched between the stopper 10 located in an inner circumference face side of the dividing wall 4a1 and the gasket 9 is located in an outer circumference face side thereof.

Moreover, the thickness t1 of the stopper 10 is made thinner than the thickness t2 of the gasket 9 (t1<t2). The height t3 of the ring shape dividing wall 4a1 is made slightly shorter than the thickness t1 of the stopper 10. The thickness t1 of the stopper 10 is determined as a condition in which a proper design tightening tolerance is given to the gasket 9, when the gasket 9 is elastically deformed so that the thickness t2 becomes t1. Moreover, the stopper 10 is pressed into a groove 4a2 which is formed by the inner circumference face of the ring shape dividing wall 4a1 and the outer circumference face of the axis portion 4b, or the stopper 10 is inserted therein in a state where a gap in the diameter direction is set to about 0 (no gap).

After the state shown in FIG. 1A, the nut 8 is tightened, through the base 7, to the axis portion 4b which projects to the outer circumference face of the measuring pipe 1 (FIG. 1B), and when the nut 8 is tightened, the gasket 9 is sandwiched between the rear face of the electrode section 4a and the inner circumference face of the measuring pipe 1, so as to be elastically deformed, whereby the thickness t2 becomes small.

Furthermore, when the nut 8 is tightened on axis portion 4b so that the thickness t2 of the gasket 9 becomes equal to the thickness t1 of the stopper 10, the elastic deformation of the gasket 9 is limited by the hardness of the stopper 10 (FIG. 1C). Here, the gasket 9 can be easily tightened with the properly designed tightening tolerance by completing tightening of the nut 8 attached to the axis portion 4b. In addition, in this state, there is a small gap (t1−t3) between the end face of the ring shape dividing wall 4a1 and the inner circumference face of the lining 3.

The hardness of the ring shape dividing wall 4a1, which is integrally formed with the rear face side of the electrode section 4a of the signal electrode 4, is harder than the stopper 10. Therefore, even if the stopper 10 moves slightly in the diameter direction of the ring shape dividing wall 4a1 at time of electrode fastening (at the time of gasket compression), since the stopper 10 is not brought into contact with the gasket 9, the stopper 10 does not interfere with the elastic deformation of the gasket 9. Moreover, it is also possible prevent part of the gasket 9 from sticking out into a space between the stopper 10 and the inner circumference faces of the lining 3 due to swelling of the part of the gasket 9 in the diameter direction of the ring shape dividing wall 4a1 during the tightening work of the nut 8. Furthermore, since the ring shape dividing wall 4a1 limits the deformation in the diameter direction of the stopper 10, it is possible to minimize the change of the tightening height due to a creep of the stopper 10 after fastening. Thereby, a long term sealing performance of the gasket 9 is secured. In addition, the "creep" means the phenomenon in which deformation of an object increases gradually with passage of time, even if external force stays constant when a force is applied thereto.

Second Example of First Embodiment

Figure 2A:
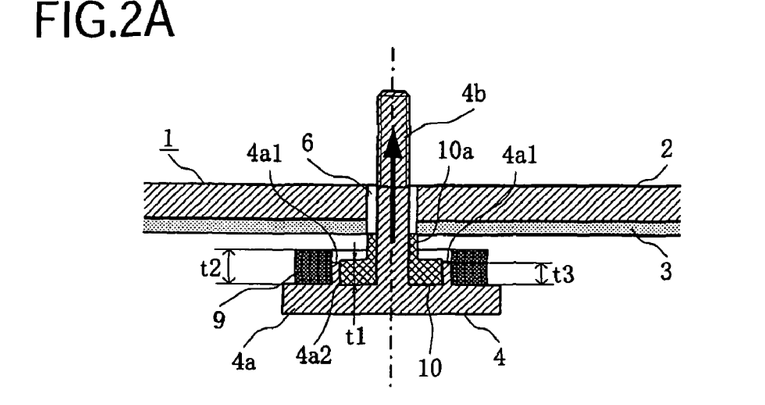
FIGS. 2A, 2B and 2C are explanatory diagrams of an installation structure of a signal electrode in an electromagnetic flowmeter according to a second example of a first embodiment.
Figure 2B:
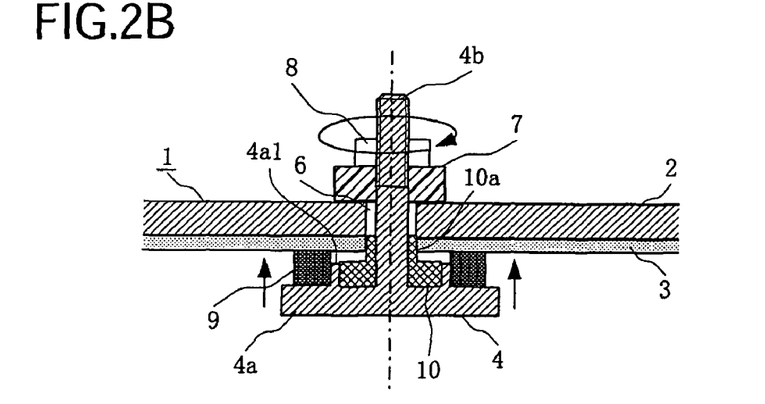
Figure 2C:
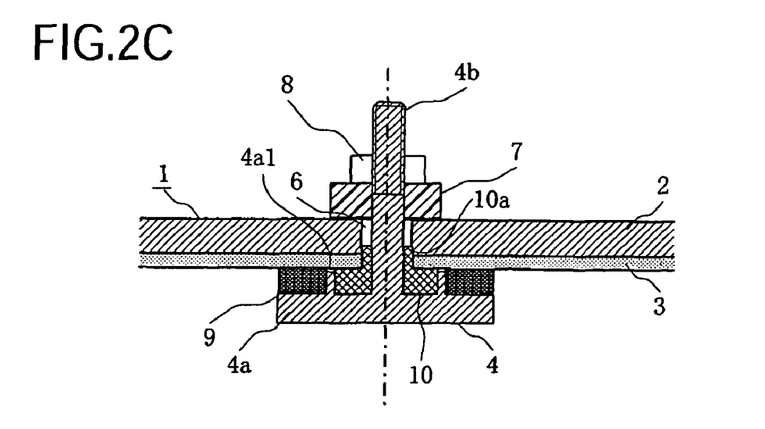

Although an upper surface of the stopper 10 has a flat shape in the first example of the first embodiment, as shown in FIGS. 2A, 2B, and 2C which respectively correspond to FIGS. 1A, 1B, and 1C, a projection portion 10a may be formed on an upper surface of the stopper 10, so as to get into the through hole 6 of the measuring pipe 1.

Third Example of First Example

Figure 3A:
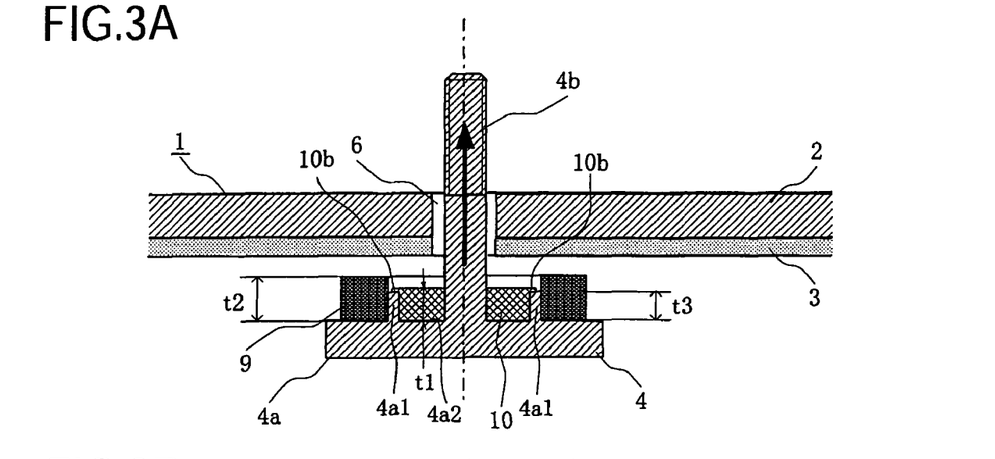
FIGS. 3A, 3B and 3C are explanatory diagrams of an installation structure of a signal electrode in an electromagnetic flowmeter according to a third example of a first embodiment.
Figure 3B:
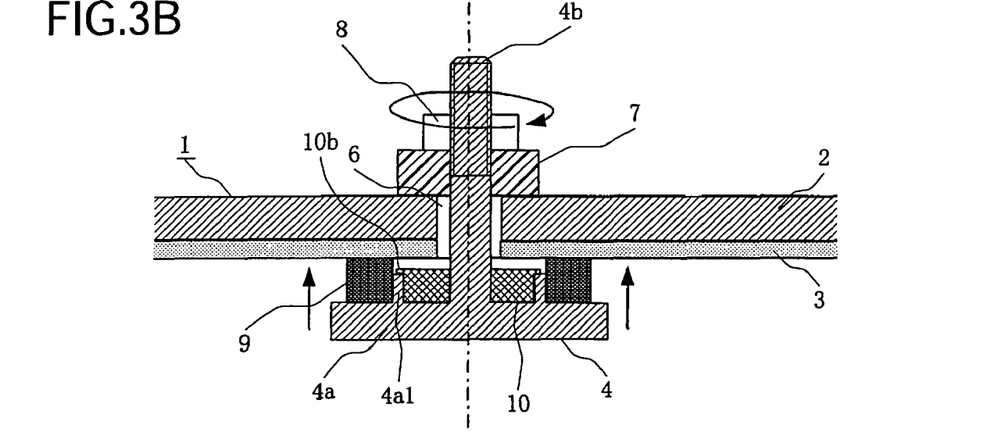
Figure 3C:
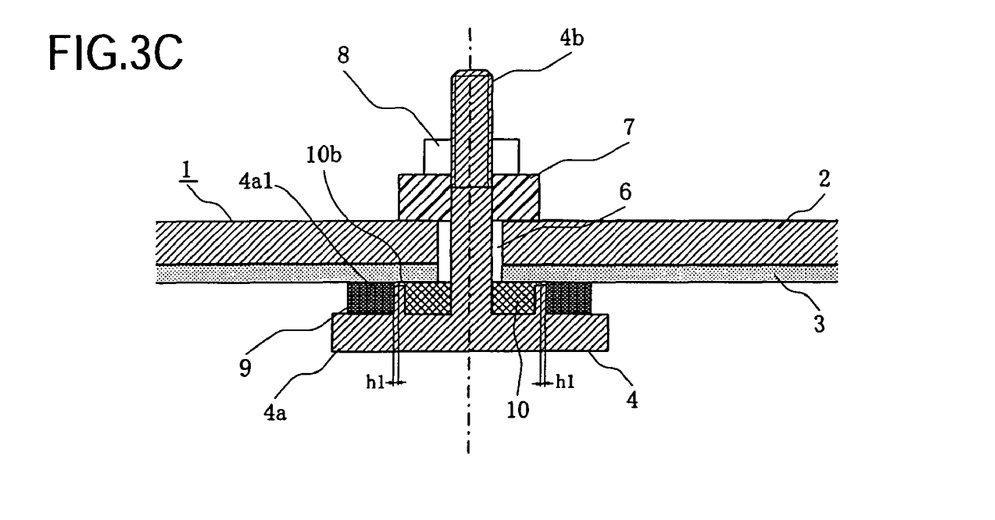

In addition, as shown in FIGS. 3A, 3B, and 3C, a flange section 10b may be formed on an upper surface of the stopper 10, wherein the flange section 10b is located between the ring shape dividing wall 4a1 and the inner circumference face (a surface of the lining 3) of the measuring pipe 1. In this case, the flange section 10b does not cover the entire upper end surface of the ring shape dividing wall 4a1 but cover part thereof so that a gap h1 is formed between the gasket 9 and the stopper 10 when the tightening is completed. Moreover, the stopper 10 is made from an elastic member, such as PTFE (polytetrafluoroethylene).

In the third example of the first embodiment, since the flange section 10b of the stopper 10 is sandwiched between the dividing wall 4a1 and the inner circumference face of the measuring pipe 1 (a surface of the lining 3), cracks of the coating etc. can be prevented since the surface of the lining 3 (powder coating face) is not directly brought in contact with the hard dividing wall 4a1, which is integrally formed with the signal electrode 4. Moreover, it is not necessary to take assembly variation in size into consideration.

Moreover, in the third example of the first embodiment, since the flange section 10b covers part of the upper end face of the ring shape dividing wall 4a1, the gap h1 is formed between the gasket 9 and the flange section 10b when tightening thereof is completed, whereby it is possible to prevent deterioration of the sealing performance thereof. That is, in case where the gasket 9 and the flange section 10b are brought in contact with each other, the seal performance thereof becomes deteriorated gradually since the gasket 9, which is pushed by the flange section 10b, is gradually deformed. In order to prevent such a problem, in the third example of the first embodiment, the gap h1 is formed between the gasket 9 and the flange section 10b when tightening thereof is completed.

Figure 4A:
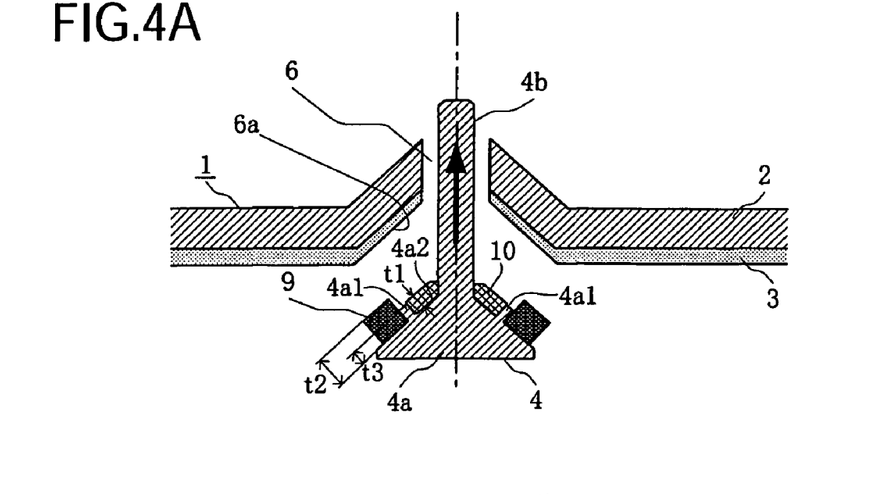
FIGS. 4A, 4B and 4C are explanatory diagrams of an installation structure of a signal electrode in an electromagnetic flowmeter according to a first example of a second embodiment.
Figure 4B:
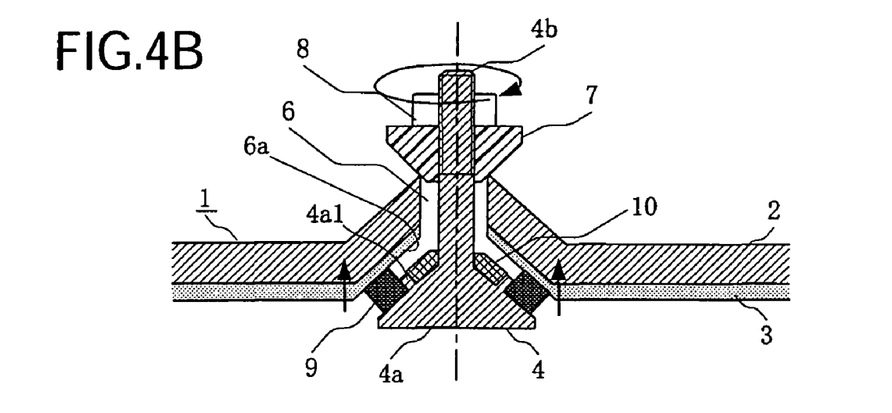
Figure 4C:
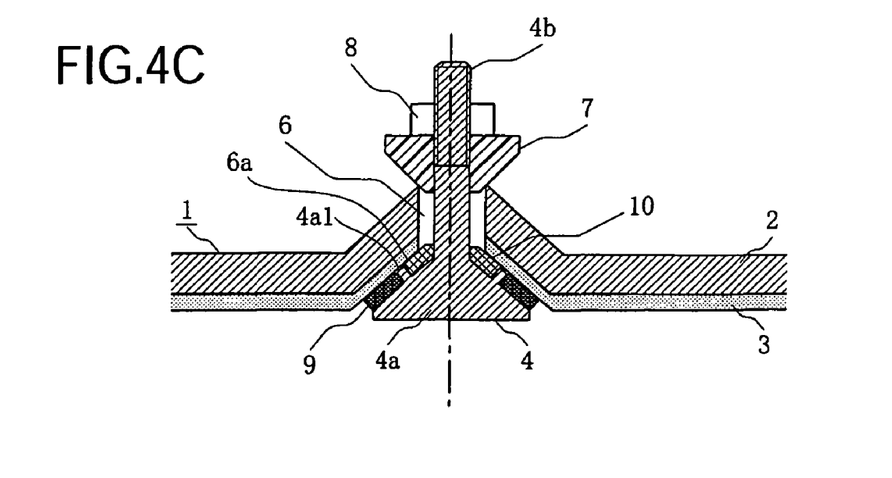

Installation Structure of Signal Electrode According to First Example of Second Embodiment FIG. 4C is a diagram of an installation structure of a signal electrode in the electromagnetic flowmeter according to a second embodiment. In FIGS. 4A, 4B and 4C, 1 denotes a measuring pipe, 2 denotes a metal pipe, 3 denotes a lining, 4 denotes a signal electrode, 4a denotes an electrode section, 4b denotes an axis portion, 6 denotes a through hole, 6a denotes an end face, 7 denotes a base, and 8 denotes a nut, which respectively correspond to the measuring pipe 10, the metal pipe 20, the lining 30, the signal electrode 40, the electrode section 40a, the axis portion 40b, the through hole 60, the edge face 60a, the base 70, and the nut 80, in the second example of the conventional installation structure shown in FIG. 9.

FIG. 4A shows a state before tightening the nut 8 on the axis portion 4b of the signal electrode 4, FIG. 4B shows a state where the nut 8 is tightened on the axis portion 4b of the signal electrode 4, and FIG. 4C shows a state where tightening of the nut 8, which is tightened to the axis portion 4b of the signal electrode 4, is completed.

In the second example of the installation structure of this signal electrode, while a gasket 9 and a stopper 10 are inserted between the end face 6a of the through hole 6 and a rear face of an electrode section 4a, which faces and the end face 6a (surface of lining 3) of the through hole 6, and which is dented in a funnel shape, the axis portion 4b is projected to an outer circumference face of the measuring pipe 1 through the through hole 6 which is provided between an inner circumference face of the measuring pipe 1 and an outer circumference face thereof, wherein the signal electrode 4 is attached to the inner circumference face of the measuring pipe 1 by tightening the nut 8 through the base 7 on the axis portion 4b which projects to the outer circumference face of the measuring pipe 1.

In the second embodiment, the gasket 9 is made from an elastic member, such as rubber, and the stopper 10 is made from material (for example, TEFLON) which is harder than that of the gasket 9. Moreover, the gasket 9 and the stopper 10 are in a ring shape, and are inserted in the axis portion 4b so that the gasket 9 is located outside the stopper 10, that is, the stopper 10 is located inside the gasket 9. The gasket 9 and the stopper 10 are located between the rear face of the electrode section 4a and the inner circumference face of the measuring pipe 1. Moreover, the ring shape dividing wall 4a1 (a projection portion) is integrally formed with a rear face side of the electrode section 4a of the signal electrode 4, and this ring shape dividing wall 4a1 is sandwiched between the stopper 10 located in the inner circumference face side of the dividing wall 4a1 and the gasket 9 located in an outer circumference face side thereof.

Moreover, the thickness t1 of the stopper 10 is made smaller than the thickness t2 of the gasket 9 (t1<t2). The height t3 of the ring shape dividing wall 4a1 is slightly shorter than the thickness t1 of the stopper 10. When the gasket 9 is elastically deformed so that the thickness t2 becomes t1, the thickness t1 of the stopper 10 is determined as a condition in which a properly designed tightening tolerance is given to the gasket 9. Moreover, the stopper 10 is pressed into a groove 4a2 which is formed by the inner circumference face of the ring shape dividing wall 4a1 and the outer circumference face of the axis portion 4b, or the stopper 10 is inserted therein in a state where a gap in the diameter direction is set to about 0.

When the nut 8 is fastened after the state shown in FIG. 4A, through the base 7, to the axis portion 4b which projects to the outer circumference face of the measuring pipe 1 (FIG. 4B), and the nut 8 is tightened, the gasket 9 is sandwiched between the rear face of the electrode section 4a and the inner circumference face of the measuring pipe 1, so as to be elastically deformed, whereby the thickness t2 becomes thin.

Furthermore, when the nut 8 is fastened on the axis portion 4b so that the thickness t2 of the gasket 9 becomes equal to the thickness t1 of the stopper 10, the elastic deformation of the gasket 9 is limited by the hardness of the stopper 10 (FIG. 4C). Here, the gasket 9 can be easily tightened with the proper design tightening tolerance by completing tightening of the nut 8 attached on the axis portion 4b. In addition, in this state, there is a small gap (t1−t3) between the end surface of the ring shape dividing wall 4a1 and the inner circumference face of the lining 3 which is the end face 6a of the through hole 6.

The hardness of the ring shape dividing wall 4a1 which is integrally formed with the rear face side of the electrode section 4a of the signal electrode 4 is harder than the stopper 10. Therefore, even if the stopper 10 moves slightly in the diameter direction of the ring shape dividing wall 4a1 at time of electrode fastening (at time of gasket compression), since the stopper 10 is not brought into contact with the gasket 9, the stopper 10 does not interfere with the elastic deformation of the gasket 9. Moreover, it is also possible to prevent part of the gasket 9 from sticking out into a space between the stopper 10 and the inner circumference face of the lining 3 due to swelling of the part of the gasket 9 in the diameter direction of the ring shape dividing wall 4a1 during the tightening work of the nut 8. Furthermore, since the ring shape dividing wall 4a1 limits the deformation in the diameter direction, it is possible to minimize the change of the tightening height due to a creep after fastening of the stopper 10. Thereby, a long term seal performance of the gasket 9 is secured.

Second Example of Second Embodiment

Figure 5A:
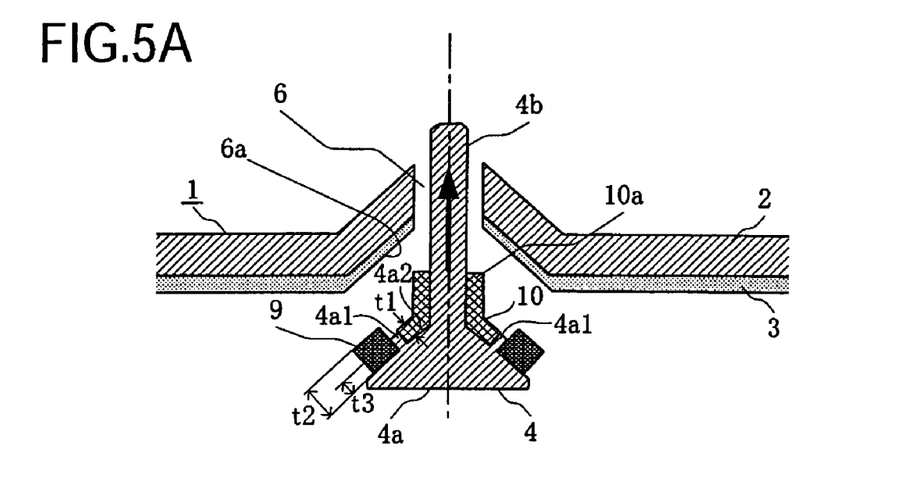
FIGS. 5A, 5B and 5C are explanatory diagrams of an installation structure of a signal electrode in an electromagnetic flowmeter according to a second example of a second embodiment.
Figure 5B:
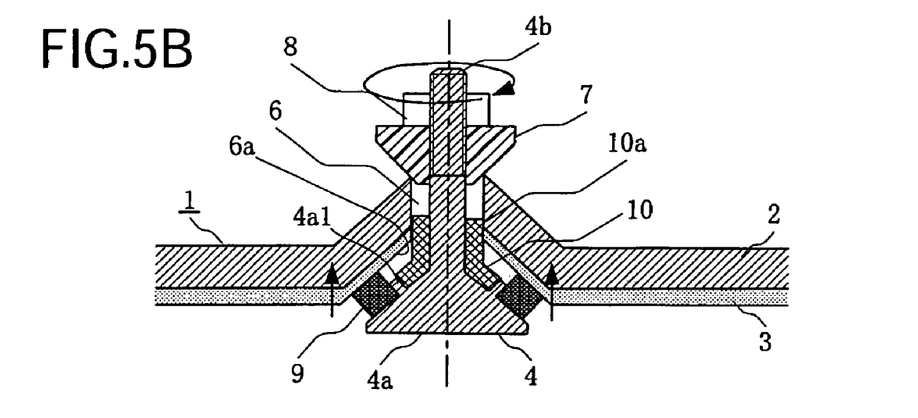
Figure 5C:
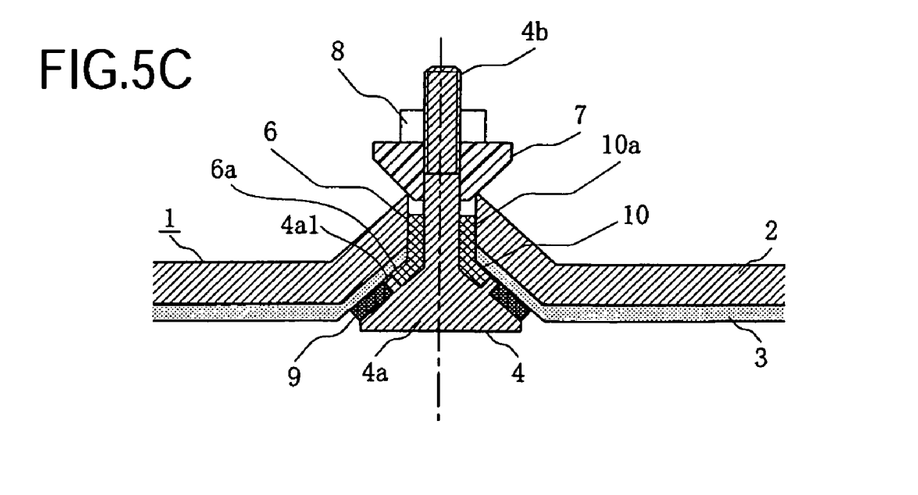

Although, in the first example of the second embodiment, the upper surface of the stopper 10 is in a flat shape, as shown in FIGS. 5A, 5B, and 5C, which respectively correspond to FIGS. 4A, 4B, and 4C, a projection section 10a may be formed on an upper surface of a stopper 10, so as to get into the through hole 6 of the measuring pipe 1.

Third Example of Second Embodiment

Figure 6A:
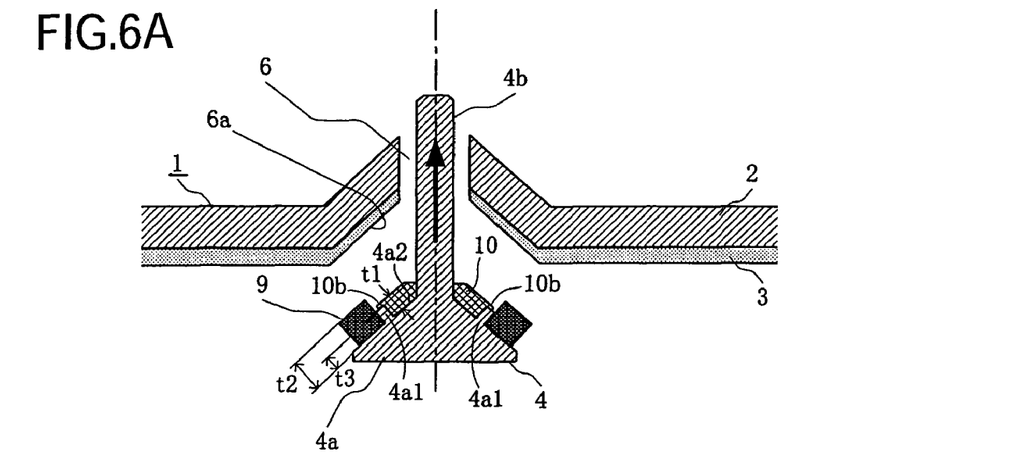
FIGS. 6A, 6B and 6C are explanatory diagrams of an installation structure of a signal electrode in an electromagnetic flowmeter according to a third example of a second embodiment.
Figure 6B:
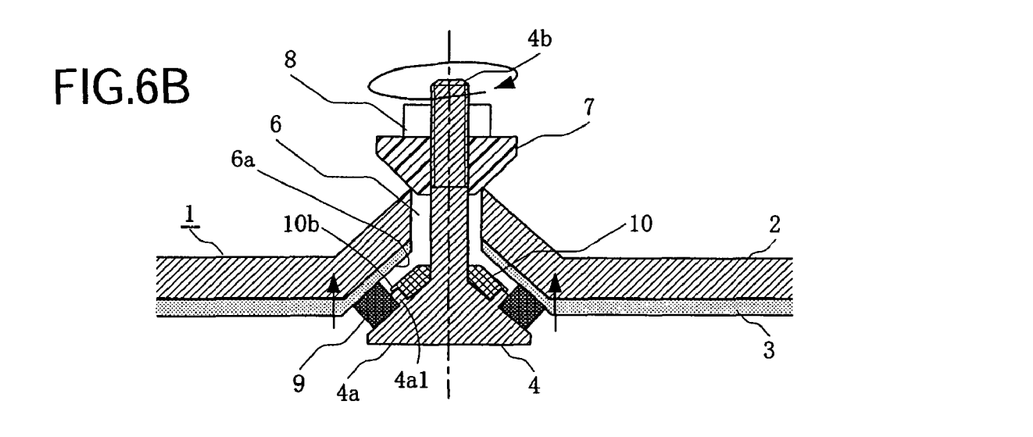
Figure 6C:
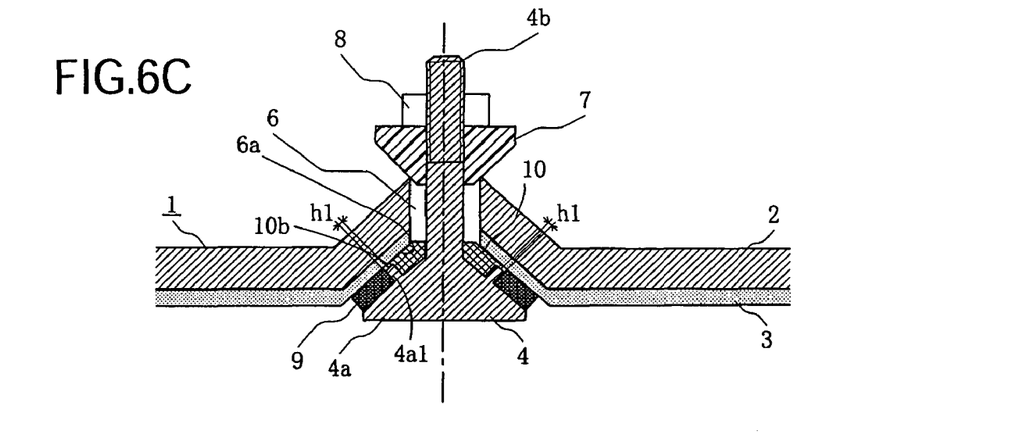

In addition, as shown in FIGS. 6A, 6B, and 6C, a flange section 10b is formed on an upper surface of a stopper 10, and a flange section 10b may be located between a ring shape dividing wall 4a1 and an inner circumference face of a lining 3 which is an end face 6a of a through hole 6. In this case, the flange section 10b does not cover the entire upper end surface of a ring shape dividing wall 4a1 but cover part thereof so that a gap h1 is formed between a gasket 9 and the stopper 10 when tightening thereof is completed. Moreover, the stopper 10 is made from an elastic member, such as PTFE.

In the third example of the second embodiment, the flange section 10b of the stopper 10 is sandwiched between the dividing wall 4a1 and the inner circumference face of the lining 3, which is the end face 6a of the through hole 6, so that cracks of coating etc. can be prevented since the surface of the lining 3 (powder coating face) is not directly brought in contact with the hard dividing wall 4a1, which is integrally formed with the signal electrode 4. Moreover, it is not necessary to take attachment variation in size into consideration.

Moreover, in the third example of the second embodiment, the flange section 10b covers part of the upper end surface of the ring shape dividing wall 4a1 so that the gap h1 is formed between the gasket 9 and the flange section 10b in a state where tightening thereof is completed, whereby it is possible to prevent deterioration of the sealing performance. That is, in case where the gasket 9 and the flange section 10*b* are brought in contact with each other, the seal performance thereof becomes deteriorated gradually since the gasket 9 which is pushed by the flange section 10*b* is deformed gradually. In order to prevent such a problem, in the third example of the second embodiment, the gap h1 is formed between the gasket 9 and the flange section 10*b* in a state where tightening thereof is completed.

Modified Example

In the above described first and second embodiments of the installation structure of the signal electrode, as long as the stopper 10 is harder than the gasket 9, the stopper 10 may be made from elastic material. Since the stopper 10 is made from a member having elasticity, it becomes possible to doubly prevent fluid leakage to the outside, by the gasket 9 and the stopper 10, thereby improving the sealing nature thereof.

Moreover, in the above described first and second embodiments of the installation structure of the signal electrode, in addition to the combination of the gasket 9 made of rubber and the stopper 10 made of TEFLON (fluorine contained resin), a combination of the gasket 9 made of TEFLON (fluorine contained resin) and the stopper 10 made of polycarbonate may be considered. Thus, there is a large variety of combinations of those materials.

In the above described first and second embodiments of the installation structure of the signal electrode, the lining 3 may not be necessarily formed by powder coating of insulating resin powder. The lining 3 may be made of TEFLON.

Moreover, in the above described first and second embodiments of the installation structure of the signal electrode, although the ring shape dividing wall 4*a*1 is integrally formed with the rear face side of the electrode section 4*a* of the signal electrode 4, the ring shape dividing wall 4*a*1 may be formed from separate material (metal) or ceramics etc. whose hardness is equivalent to that of the electrode.

Moreover, in the above mentioned first and second embodiments of the installation structure of the signal electrode, although the gasket 9 is located outside the stopper 10, the gasket 9 may be configured so as to be located inside the stopper 10.

The present electromagnetic flowmeter can be used, in various fields such as a process control, etc., as an apparatus which measures the volume of fluid flowing inside an arranged pipe.

The preceding description has been presented only to illustrate and describe exemplary embodiments of the present electromagnetic flowmeter. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An electromagnetic flowmeter comprising:
   An exciting coil which generates a magnetic field in a direction perpendicular to a flow direction of fluid flowing through an inside of a measuring pipe;
   a signal electrode which faces a direction perpendicular to the magnetic field generated by the exciting coil, and which is provided on an inner circumference face of the measuring pipe,
   wherein an electromotive force, which is generated in the fluid flowing through the inside of the measuring pipe due to the magnetic field generated by the exciting coil, is taken out by the signal electrodes,
   wherein the signal electrode comprises an electrode section which is in contact with the fluid and an axis portion provided on a rear face of the electrode section, which faces an inner circumference face of the measuring pipe,
   wherein a sealing member including a first member which has elasticity, a second member which is harder than the first member, and a ring shape dividing wall which is harder than the second member, are inserted between the rear face of the electrode section and the inner circumference face of the measuring pipe, in a state where the ring shape dividing wall is sandwiched between the first member and the second member, and
   wherein the axis portion is projected to an outer circumference face of the measuring pipe through a through hole which is formed between the inner circumference face of the measuring pipe and an outer circumference face thereof, and a fastening member is fastened on the axis portion which projects to the outer circumference face of the measuring pipe, so that the first member is sandwiched between the rear face of the electrode section and the inner circumference face of the measuring pipe so as to be elastically deformed, whereby the signal electrode is attached to the inner circumference face of the measuring pipe.

2. The electromagnetic flowmeter according to claim 1, wherein the ring shape dividing wall is integrally formed with the rear face of the electrode section of the signal electrode.

3. The electromagnetic flowmeter according to claim 1, wherein the first member is made of rubber and the second member is made of resin.

4. The electromagnetic flowmeter according to claim 1, wherein the second member has flange section which is located between the ring shape dividing wall and the inner circumference face of the measuring pipe.

5. The electromagnetic flowmeter according to claim 1, wherein the second member is in a ring shape.

6. The electromagnetic flowmeter according to claim 5, wherein the electrode section of the signal electrode is in a plate shape, the axis portion of the signal electrode is provided so as to project from the rear face of the plate shape electrode section, one of the first and second members is provided in the inside of the other, and the other is provided in the outside of the one of the first and second members, and the first and second members are inserted between the rear face of the electrode section and the inner circumference face of the measuring pipe.

7. The electromagnetic flowmeter according to claim 5, wherein the electrode section of the signal electrode is in a funnel shape, the axis portion of the signal electrode projects from a neck base of the funnel shape electrode section, and an end face of a through hole of the measuring pipe, in which the axis portion of the signal electrode is inserted, has a dent portion so as to fit on the funnel shape of the electrode section, one of the first and second members is provided in the inside the other, and the other is provided in the outside of the one of the first and second members, and the first and second members are inserted between the rear face of the electrode section and the end face of the through hole of the measuring pipe.

* * * * *